US009126248B2

(12) United States Patent
Jeong et al.

(10) Patent No.: US 9,126,248 B2
(45) Date of Patent: Sep. 8, 2015

(54) ASYMMETRIC ROLLING APPARATUS, ASYMMETRIC ROLLING METHOD AND ROLLED MATERIALS FABRICATED BY USING THE SAME

(75) Inventors: Hyo-Tae Jeong, Gangwon (KR); Byung-Hak Choe, Gangwon (KR)

(73) Assignee: GANGNEUNG-WONJU NATIONAL UNIVERSITY INDUSTRY ACADEMY COOPERATION GROUP, Gangwon (KR)

( * ) Notice: Subject to any disclaimer, the term of this patent is extended or adjusted under 35 U.S.C. 154(b) by 906 days.

(21) Appl. No.: 13/294,625

(22) Filed: Nov. 11, 2011

(65) Prior Publication Data
US 2012/0251379 A1 Oct. 4, 2012

(30) Foreign Application Priority Data

Mar. 28, 2011 (KR) ........................ 10-2011-0027652

(51) Int. Cl.
*B21B 1/22* (2006.01)
*B32B 15/01* (2006.01)

(52) U.S. Cl.
CPC ................ *B21B 1/227* (2013.01); *B32B 15/01* (2013.01); *B21B 2265/24* (2013.01); *B21B 2267/06* (2013.01); *B21B 2267/065* (2013.01)

(58) Field of Classification Search
CPC .. B21B 1/227; B21B 2003/001; B21B 37/46; B21B 2265/24; B21B 2267/065
USPC ................ 72/199, 226, 229, 234, 240, 241.2, 72/241.4, 365.2, 366.2
See application file for complete search history.

(56) References Cited

U.S. PATENT DOCUMENTS

| 1,898,061 | A | * | 2/1933 | Otte ............................. 148/111 |
| 4,406,715 | A | * | 9/1983 | Nakayama et al. ........... 148/111 |
| 4,614,099 | A | * | 9/1986 | Coulter .......................... 72/29.1 |
| 6,374,656 | B1 | * | 4/2002 | Donini et al. ................ 72/241.8 |
| 8,210,011 | B2 | * | 7/2012 | Muramatsu et al. ............ 72/234 |
| 8,720,242 | B2 | * | 5/2014 | Ogawa et al. .................. 72/10.2 |
| 2013/0031944 | A1 | * | 2/2013 | Muralidharan et al. ........ 72/200 |

FOREIGN PATENT DOCUMENTS

| JP | 53-133555 A | * | 11/1978 | ................ B21B 1/22 |
| JP | 57-165116 | * | 10/1982 | .............. B21B 45/06 |
| JP | 60-102219 A | * | 6/1985 | .............. B21B 37/00 |

(Continued)

OTHER PUBLICATIONS

KIPO NOA dated May 20, 2013; Appln. No. 10-2011-0027652.

*Primary Examiner* — Edward Tolan
(74) *Attorney, Agent, or Firm* — Ladas & Parry LLP

(57) ABSTRACT

Provided is an asymmetric rolling method including: entering a to-be-rolled material having a first surface and a second surface between a first roll and a second roll that has a greater diameter than that of the first roll and a rotary angular speed that is different from that of the first roll while the first surface and the second surface respectively contact the first roll and the second roll, followed by rolling, and entering the rolled to-be-rolled material between a third roll and a fourth roll that has a greater diameter than that of the third roll and a rotary angular speed that is different from that of the third roll while the first surface and the second surface respectively contact the fourth roll and the third roll, followed by rolling, wherein different shear stresses are applied to the first and second surfaces of the to-be-rolled material.

15 Claims, 13 Drawing Sheets

(56) References Cited

FOREIGN PATENT DOCUMENTS

| | | |
|---|---|---|
| JP | 09-271817 A | 10/1997 |
| JP | 2004-306046 A | 11/2004 |
| KR | 1020050121759 A | 12/2005 |
| KR | 10-0819834 B1 | 3/2008 |
| KR | 1020110105185 A | 9/2011 |

* cited by examiner (a)

(b)

(a)

(b)

ASYMMETRIC ROLLING APPARATUS, ASYMMETRIC ROLLING METHOD AND ROLLED MATERIALS FABRICATED BY USING THE SAME

CROSS-REFERENCE TO RELATED PATENT APPLICATION

This application claims the benefit of Korean Patent Application No. 10-2011-0027652, filed on Mar. 28, 2011, in the Korean Intellectual Property Office, the disclosure of which is incorporated herein in its entirety by reference.

BACKGROUND OF THE INVENTION

1. Field of the Invention

The present invention relates to a rolling technique for forming a to-be-rolled material, such as a metal member, into a rolled material, and more particularly, to a rolling technique for improving a material property, such as formability, of a rolled material by controlling a texture of the rolled material.

2. Description of the Related Art

In general, rolling is performed to process a metal member into, for example, a plate having a predetermined size. During the rolling, a micro structure of a to-be-rolled material is changed according to a volumetric change of the to-be-rolled material. Due to the change in the micro structure of the to-be-rolled material, the to-be-rolled material has a texture in which crystals are arranged in a preferred orientation direction. The texture formed by the rolling highly affects a material property, such as formability, of the to-be-rolled material. Accordingly, controlling the texture of the to-be-rolled material during rolling may result in an improvement in the material property, such as formability, of the rolled material after the rolling.

SUMMARY OF THE INVENTION

The present invention provides a rolling method that provides excellent material properties, such as high formability, by controlling a texture of a to-be-rolled material.

The present invention also provides a to-be-rolled material that has improved material properties, such as formability, by using the rolling method.

The present invention also provides a rolling apparatus that improves material properties, such as formability, of a to-be-rolled material by using the rolling method.

However, the goals of the present invention are not limited thereto, and unmentioned other goals may also be obvious to one of ordinary skill in the art in view of descriptions presented below.

According to an aspect of the present invention, there is provided an asymmetric rolling method including: entering a to-be-rolled material having a first surface and a second surface between a first roll and a second roll that has a greater diameter than that of the first roll and a rotary angular speed that is different from that of the first roll while the first surface and the second surface respectively contact the first roll and the second roll, followed by rolling, and entering the rolled to-be-rolled material between a third roll and a fourth roll that has a greater diameter than that of the third roll and a rotary angular speed that is different from that of the third roll while the first surface and the second surface respectively contact the fourth roll and the third roll, followed by rolling, wherein different shear stresses are applied to the first and second surfaces of the to-be-rolled material.

While rotary linear velocities of the first and second rolls are maintained to be identical to each other and rotary linear velocities of the third and fourth rolls are maintained to be identical to each other, the to-be-rolled material is rolled.

While rotary linear velocities of the first, second, third, and fourth rolls are maintained to be identical to each other, the to-be-rolled material is rolled.

While the diameter of the first roll is identical to the diameter of the third roll and the diameter of the second roll is identical to the diameter of the fourth roll.

A first backup roll that has a greater diameter than that of the first roll is coupled to the first roll on an opposite side of the second roll to support the first roll, and a second backup roll that has a greater diameter than that of the third roll is coupled to the third roll on the opposite side of the fourth roll to support the third roll.

The to-be-rolled material is rolled at least two times in the same rolling direction of the to-be-rolled material. Alternatively, the to-be-rolled material is rolled at least two times, wherein the at least two times of rolling includes changing the rolling direction of the to-be-rolled material and rolling the to-be-rolled material in the changed rolling direction, for at least one cycle.

A rolled material fabricated by using the asymmetric rolling method of one of the methods described above.

The rolled material has a hexagonal closed packed (HCP) structure, a face centered cubic (FCC) structure, or a body centered cubic (BCC) structure. The rolled material may include one selected from the group consisting of magnesium (Mg), titanium (Ti), zirconium (Zr), zinc (Zn), aluminum (Al), copper (Cu), iron (Fe), and steel, or an alloy thereof.

According to another aspect of the present invention, there is provided an asymmetric rolling apparatus including: a first unit including a first roll that is to contact a first surface of a to-be-rolled material and a second roll that has a greater diameter than that of the first roll and contacts a second surface of the to-be-rolled material which is opposite to the first surface; a second unit that is arranged near the first unit and rolls the to-be-rolled material which has been rolled by the first unit, and includes a third roll that is to contact the second surface of the to-be-rolled material and a fourth roll that has a greater diameter of that of the third roll and is to contact the first surface of the to-be-rolled material; and a power supply unit for supplying power to each of the first through fourth rolls to control rotary angular speeds of the first through fourth rolls.

The power supply unit may control the first through fourth rolls such that the first and second rolls have the same rotary linear velocities and the third and fourth rolls have the same rotary linear velocities.

A diameter of the first roll may be identical to a diameter of the third roll and a diameter of the second roll may be identical to a diameter of the fourth roll.

The power supply unit may include a plurality of motors that respectively drive the first roll, the second roll, the third roll, and the fourth roll; and a motor controller for controlling rotary angular speeds of the motors separately. In this case, for example, the motor controller may include a first motor controller that controls motors such that the rotary linear velocity of the first roll is identical to the rotary linear velocity of the second roll and a second motor controller that controls motors such that the rotary linear velocity of the third roll is identical to the rotary linear velocity of the fourth roll.

The asymmetric rolling apparatus may further include a first backup roll that has a greater diameter than that of the first roll and is coupled to the first roll on an opposite side of the second roll to support the first roll, and a second backup roll that has a greater diameter than that of the third roll and is coupled to the third roll on an opposite side of the fourth roll to support the third roll.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
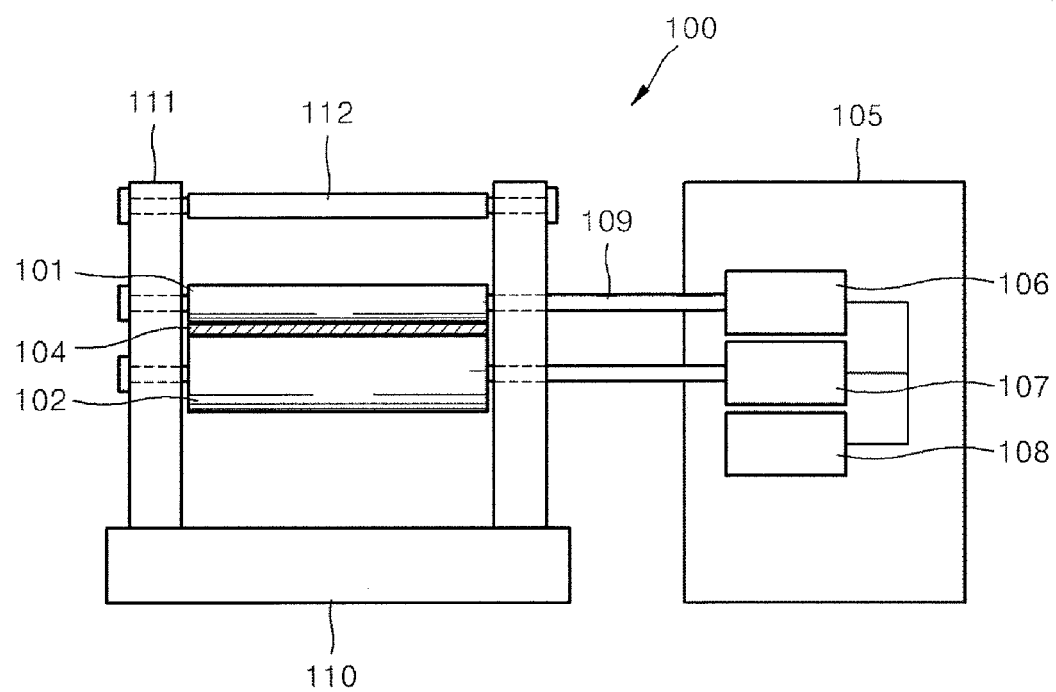
FIGS. 1A and 1B are front and perspective views of a rolling apparatus according to an embodiment of the present invention, respectively.
Figure 1:
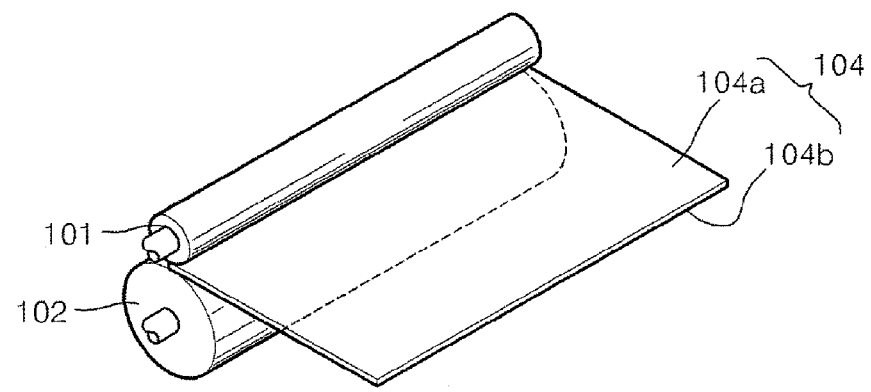

Hereinafter, with reference to the attached drawings, exemplary embodiments of the present invention will be described in detail. Also, when the present invention is described, if it is considered that detailed descriptions on related known structures or functions may make the present invention unclear, they will not be presented herein.

A rolling apparatus and a rolling method according to the present invention may be applied to any applicable to-be-rolled materials to improve their material properties, such as formability. The following embodiments illustrate a technical concept of the present invention.

Also, the present invention may, however, be embodied in many different forms and should not be construed as being limited to the embodiments set forth herein; rather, these embodiments are provided so that this disclosure will be thorough and complete, and will fully convey the concept of the invention to those of ordinary skill in the art. In the drawings, elements may be exaggerated or shrunken in size for ease of description.

In embodiments of the present invention, a texture refers to a state in which the respective crystalline grains of a polycrystalline material are arranged in a predetermined direction. In embodiments of the present invention, a texture of a material is used as a relative concept rather than an absolute concept. That is, if it is said that a material has a predetermined direction of texture, it means that a majority of crystalline grains of the material have that direction of texture. That is, it is not necessary that all crystalline grains of the material have that direction of texture.

In embodiments of the present invention, a pole figure may be illustrated as a stereographic projection-type picture showing distribution directions of crystallographic lattice surfaces in analyzing the crystal orientation or texture of a material. The pole figure may be illustrated by X-ray diffraction (XRD) analysis.

In embodiments of the present invention, the term 'to-be-rolled material' refers to a subject on which rolling is to be performed, and the term 'rolled material' refers to a subject that has a target shape obtained after rolling of the to-be-rolled material is completed. In this regard, opposite surfaces of the to-be-rolled material respectively contact rolls, and for ease of description, among surfaces of the to-be-rolled material where initial rolling begins, a surface of the to-be-rolled material which contacts a upper roll will be referred to as a first surface and a surface of the to-be-rolled material which is opposite to the first surface and contacts a lower roll will be referred to as a second surface.

In embodiments of the present invention, the term 'unit' refers to a set including as working rolls an upper roll and a lower roll which are respectively disposed above and under the to-be-rolled material and perform rolling on the to-be-rolled material. Also, the term 'pass' may refer to performing rolling through a unit.

FIGS. 1A and 1B are front and perspective views of a rolling apparatus 100 according to an embodiment of the present invention, respectively. In detail, FIG. 1A is a front view of the rolling apparatus 100 according to the present embodiment, and FIG. 1B is a perspective view of rolls 101 and 102 and a to-be-rolled material 104 included in the rolling apparatus 100 of FIG. 1A.

As illustrated in FIGS. 1A and 1B, the rolling apparatus 100 according to the present embodiment is an asymmetric rolling apparatus including the first roll 101 and the second roll 102 which have different diameters. In detail, the rolling apparatus 100 includes the first roll 101 that are to contact a first surface 104a of the to-be-rolled material 104, the second roll 102 that has a greater diameter than that of the first roll 101 and contacts a second surface 104b of the be-rolled material 104, and a power supply unit 105 that supplies power to the first and second rolls 101 and 102 to control the first and second rolls 101 and 102 such that the first and second rolls 101 and 102 have different rotary angular speeds.

The first and second rolls 101 and 102 are working rolls for rolling, and as illustrated in FIG. 1A, the first and second rolls 101 and 102 may be disposed parallel to each other while spaced apart from each other above the support 110 and may be installed at a fixed frame 111 by a coupling member 112, such as a screw.

In this regard, the power supply unit 105 may include a first motor 106 and a second motor 107 that respectively drive the first roll 101 and the second roll 102, and a motor controller 108 for controlling rotary angular speeds of the first and second motors 106 and 107. The first and second motors 106 and 107 deliver rotary power to the first roll 101 and the second roll 102 through a connection member 109.

The motor controller 108 controls rotary angular speeds of the first roll 101 and the second roll 102 which are connected to the first and second motors 106 and 107 by controlling rotary angular speeds of the first and second motors 106 and 107, and through the control, a rotary linear velocity, which is defined as a multiple of a radius of a roll by a rotary angular speed, may be controllable.

Through the control of the rotary linear velocity, a shear stress that is applied onto the first surface 104a of the to-be-rolled material 104 by the first roll 101 and a shear stress that is applied onto the second surface 104b of the to-be-rolled material 104 by the second roll 102 may be controlled to be different from each other.

As an example, the motor controller 108 may control such that the first roll 101 and the second roll 102 perform rolling on the to-be-rolled material 104 interposed between the first roll 101 and the second roll 102 while rotary linear velocities of the first roll 101 and the second roll 102 are maintained to be identical to each other.

That is, a ratio of rotary angular speeds of the first and second rolls 101 and 102 is controlled to be identical to a ratio of inverse numbers of radii of the first and second rolls 101 and 102, and thus, rotary linear velocities of the first and second rolls 101 and 102 may be maintained to be identical to each other. In this regard, the term "identical" refer to a substantial identity that includes, in addition to a complete identity, an identity that is within a process margin induced from an error that is necessarily included due to characteristics of a mechanical apparatus although an operator controls signals of the motor controller 108 in an attempt to make rotary angular speeds of the rolls to be identical to each other. The 'identity' of the rotary linear velocities of the first and second rolls 101 and 102 will be applied with the same meaning below.

Also, according to another embodiment of the present invention, as illustrated in FIGS. 2A and 2B, the first the rolling apparatus 100 may further include a backup roll 103 that has a greater diameter than that of the first roll 101, and is coupled to the first roll 101 on an opposite side of the second roll 102 to support the first roll 101. In this case, the first and second rolls 101 and 102 may be working rolls that contact the first and second surfaces 104a and 104b of the to-be-rolled material 104 and directly apply shear stress thereon. The backup roll 103 may allow the first roll 101 to make a balance against an external force that is applied by the second roll 102 having a greater diameter that the first roll 101 during rolling.

The power supply unit 105 may include the first motor 106 for driving the first roll 101 or the backup roll 103, the second motor 107 for driving the second roll 102, and the motor controller 108 for controlling rotary angular speeds of the first and second motors 106 and 107.

The first motor 106, as illustrated in FIG. 2A, is connected to the backup roll 103 to deliver a driving force thereto, and while the backup roll 103 is rotated, the first roll 101 that is coupled to and contacts the backup roll 103 is rotated together with the backup roll 103 due to friction. Although not illustrated, alternatively, the first motor 106 may be connected to the first roll 101 to rotate the first roll 101, and based on the same principle as described above, the backup roll 103 is rotatable due to friction.

A to-be-rolled material that is rolled by using an asymmetric rolling apparatus according to the above embodiments of the present invention or a rolled material thereof may include various metals or metal alloys on which rolling is performable. Such metals or metal alloys may have a hexagonal closed packed (HCP) structure, a face centered cubic (FCC) structure, or a body centered cubic (BCC) structure. For example, such metals or metal alloys may include one selected from the group consisting of magnesium (Mg), titanium (Ti), zirconium (Zr), zinc (Zn), aluminum (Al), copper (Cu), iron (Fe), and steel, or an alloy thereof.

Hereinafter, a rolling method according to an embodiment of the present invention will be described using a magnesium material having a HCP structure as an example of a to-be-rolled material.

Magnesium, which is recently studied as a next-generation lightweight material, has a density of 1.74 $g/cm^3$ and is relatively lightweight compared to iron having a density of 7.90 $g/cm^3$ or aluminum having a density of 2.7 $g/cm^3$, and also have excellent specific strength and specific elasticity modulus. Also, magnesium has excellent absorption capabilities with respect to vibration, impact, electronic waves, etc. and has excellent electrical and thermal conductivity. Due to these features, it is applied as a lightweight material in electronic industry fields, such as mobile phones, notebook computers, or the like, as well as vehicles or airplanes.

Figure 15:
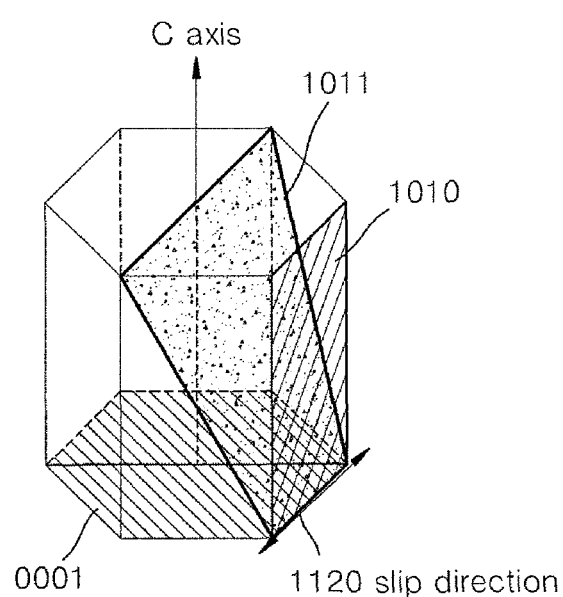
FIG. 15 is a schematic view of a slip system of a hexagonal closed packed (HCP) structure.

However, a slip system for forming magnesium having a HCP structure is not well developed, and thus magnesium has poor formability at room temperature. That is, magnesium is deformed along, as illustrated in FIG. 15, typically, a $\{0001\}<1120>$ basal plane slip system, a $\{1010\}<1120>$ prismatic slip system, a $\{1011\}<1120>$ piramidal slip system, or the like. However, at room temperature, critical resolved shear stress values of other deformation systems than the basal plane slip system are very high than a critical resolved shear stress value of the basal plane slip system. Thus, configuration of the basal plane slip system in a sample substantially affects room-temperature formability.

Figure 16:
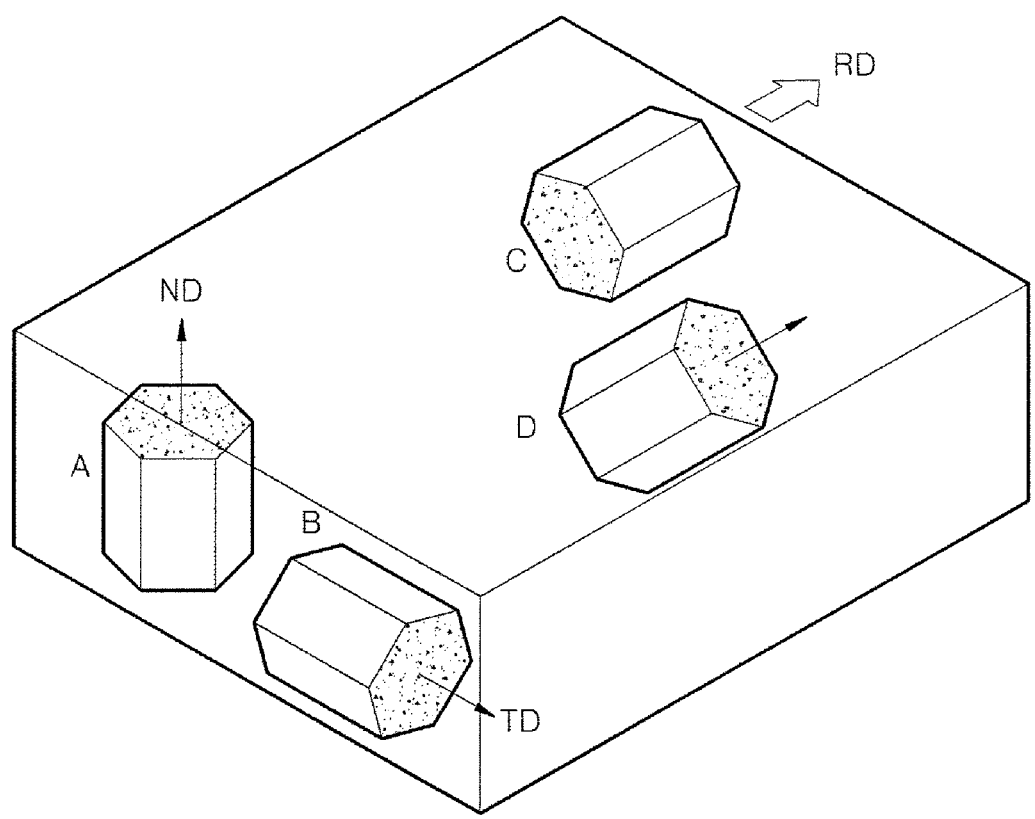
FIG. 16 is a schematic view illustrating a configuration of a slip system according to a crystal orientation of a HCP structure.

Referring to FIG. 16, like A, when the basal plane slip system is disposed parallel to a rolling surface of the to-be-rolled material (that is, perpendicular to ND) or like B or C, when the basal plane slip system is disposed perpendicular to a lateral direction (TD) or a rolling direction (RD), room-temperature formability may deteriorate. This is because when rolled magnesium is formed, major deformation directions (ND, RD and TD of FIG. 16) and the basal plane slip system may be perpendicular or parallel to each other, and thus, operation of the basal plane slip system with respect to an external stress may be difficult.

However, when the basal plane slip system, like D of FIG. 16, is disposed at an angle with respect to a major deformation direction (that is, a rolling direction) on a slip surface and a slip direction surface, deformation of a material may be easily achieved and thus excellent room-temperature formability may be obtained. The configuration direction and distribution of the basal plane slip system in the material may be confirmed with reference to a pole figure.

Figure 17:
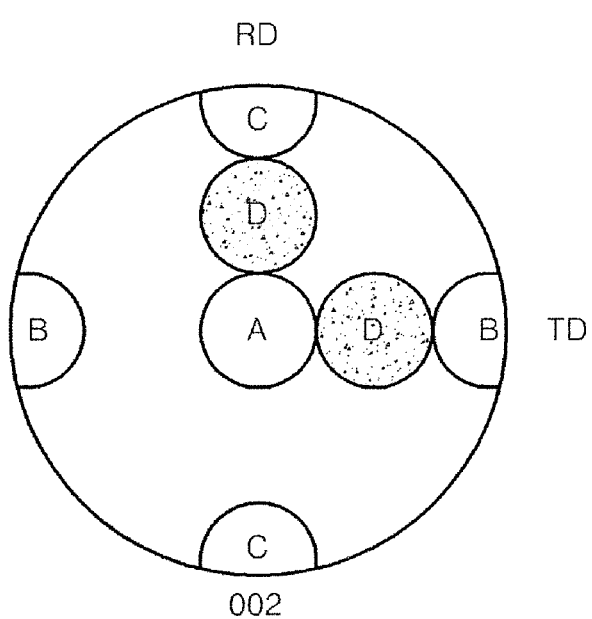
FIG. 17 illustrates pole points of A, B, C, D crystals within a (0001) pole figure of a HCP structure.

FIG. 17 illustrates a pole configuration on a (0001) pole figure according to configuration type of crystal. Referring to FIG. 17, regions A, B and C respectively refer to a pole configuration when the basal plane slip system is parallel to a rolling surface of a to-be-rolled material, a pole configuration when the basal plane slip system is perpendicular to a lateral direction, and a pole configuration when the basal plane slip system is perpendicular to a rolling direction, and region D refers to a pole configuration when the basal plane slip system is disposed at an angle with respect to the rolling direction.

Figure 2:
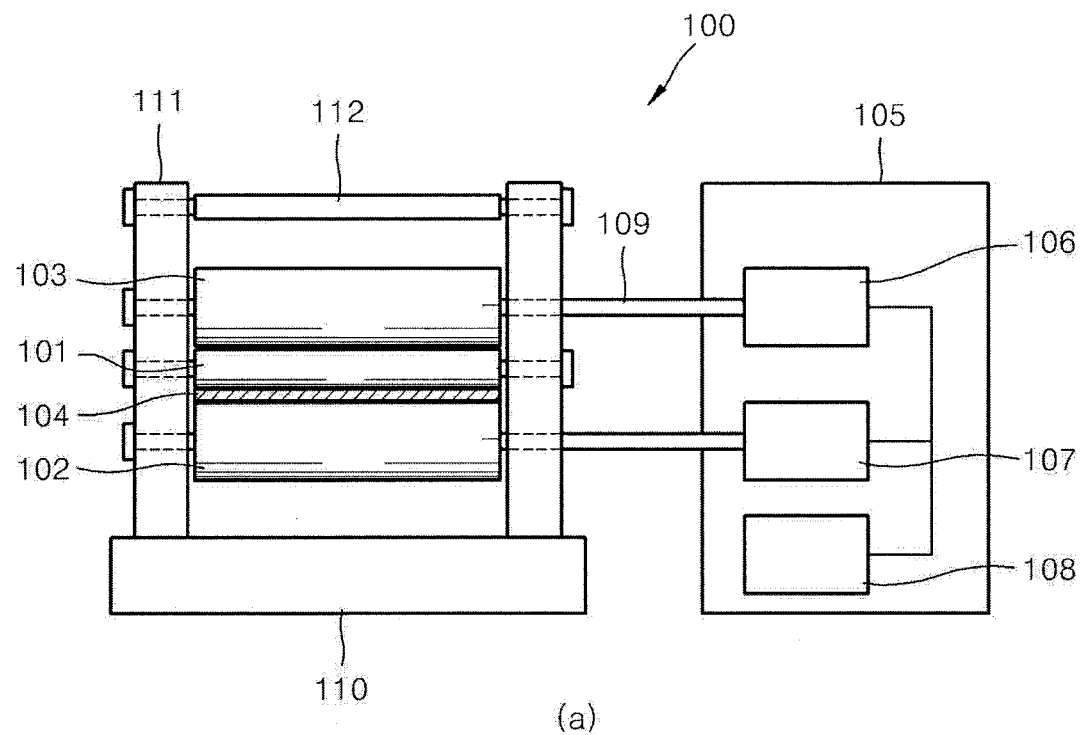
FIGS. 2A and 2B are front and perspective views of a rolling apparatus according to another embodiment of the present invention, respectively.
Figure 2:
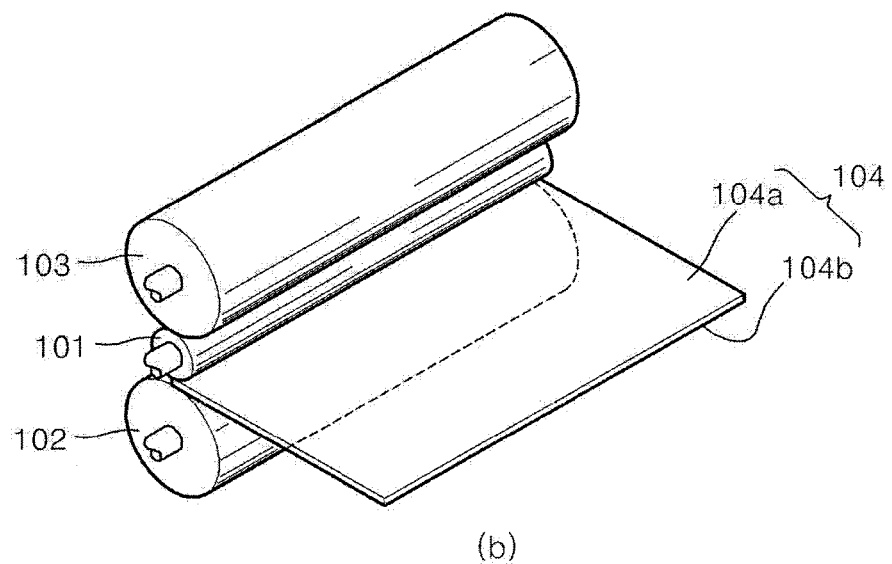
Figure 3:
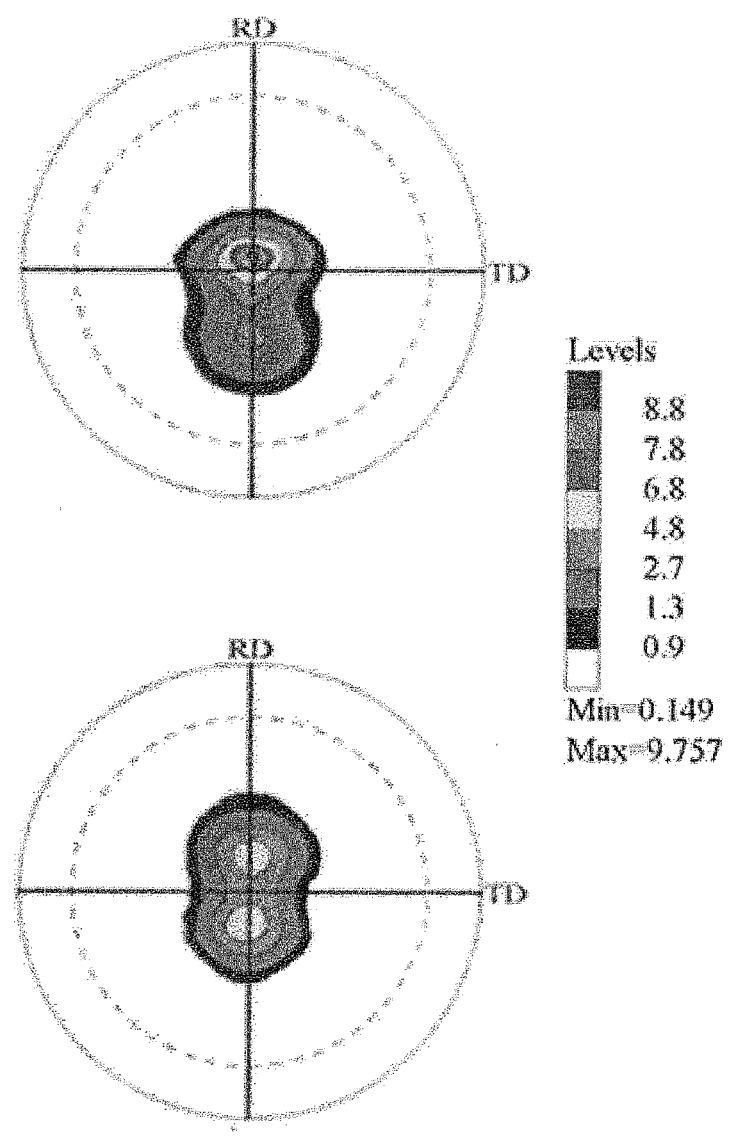
FIG. 3 illustrates a (0001) pole figure of an AZ31 alloy which is rolled by using the rolling apparatus of FIG. 2.

FIG. 3 illustrates a (0001) pole figure obtained when an AZ31 alloy was rolled five times while the first and second rolls 101 and 102 were controlled to have the same rotary linear velocities by using the rolling apparatus of FIG. 2. In this regard, a reduction ratio of the AZ31 alloy was 75% and a rolling temperature was 300° C. The five times of rolling was rolling in the same rolling direction and was performed such that shear stress was applied onto the first and second surfaces 104a and 104b of AZ31 as the to-be-rolled material while the first and second surfaces 104a and 104b respectively contacted the first and second rolls 101 and 102. The lower diagram of FIG. 3 illustrates a (0001) pole figure of the first surface 104a on which shear stress was applied by the first roll 101, and the upper diagram of FIG. 3 illustrates a (0001) pole figure of the second surface 104b on which shear stress was applied by the second roll 102.

Referring to FIG. 3, it is confirmed that when an asymmetric rolling method according to an embodiment of the present invention is used, a basal plane of HCP on the (0001) pole figure, that is, a crystal direction of a (0001) plane is away from a center thereof. In detail, a rotary angle (that is, an angle offset from the center) of a pole point of a basal plane in the first surface 104a that is subjected to shear deformation by the first roll 101 is about 15° and a rotary angle of the second surface 104b that is subjected to shear deformation by the second roll 102 is about 6°

Figure 4:
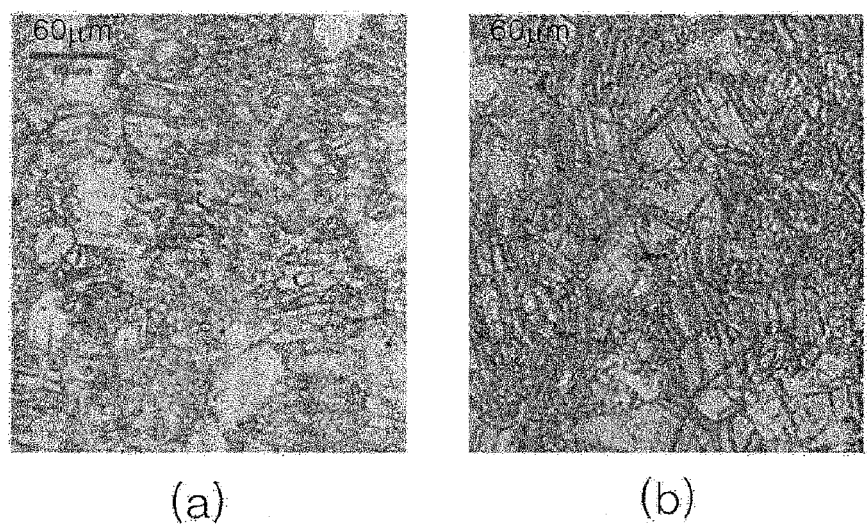
FIG. 4 shows pictures showing surface states of an AZ31 alloy which is rolled by using a rolling method described with reference to FIG. 3.

In this case, as shown in FIG. 4, the first surface 104a of the rolled material 104 which has been rolled by the first roll 101, which is smaller than the second roll 102, has a micro structure as shown in FIG. 4A, and the second surface 104b of the rolled material 104 which has been rolled by the second roll 102, which is larger than the first roll 101, has a micro structure as shown in FIG. 4B.

Figure 5:
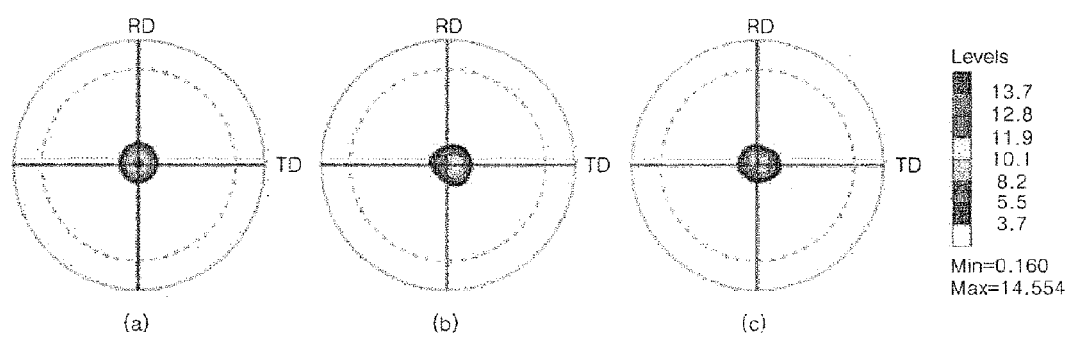
FIGS. 5 to 7 illustrate (0001) pole figures of AZ31 alloy which is rolled by using a rolling method according to a comparative embodiment.
Figure 6:
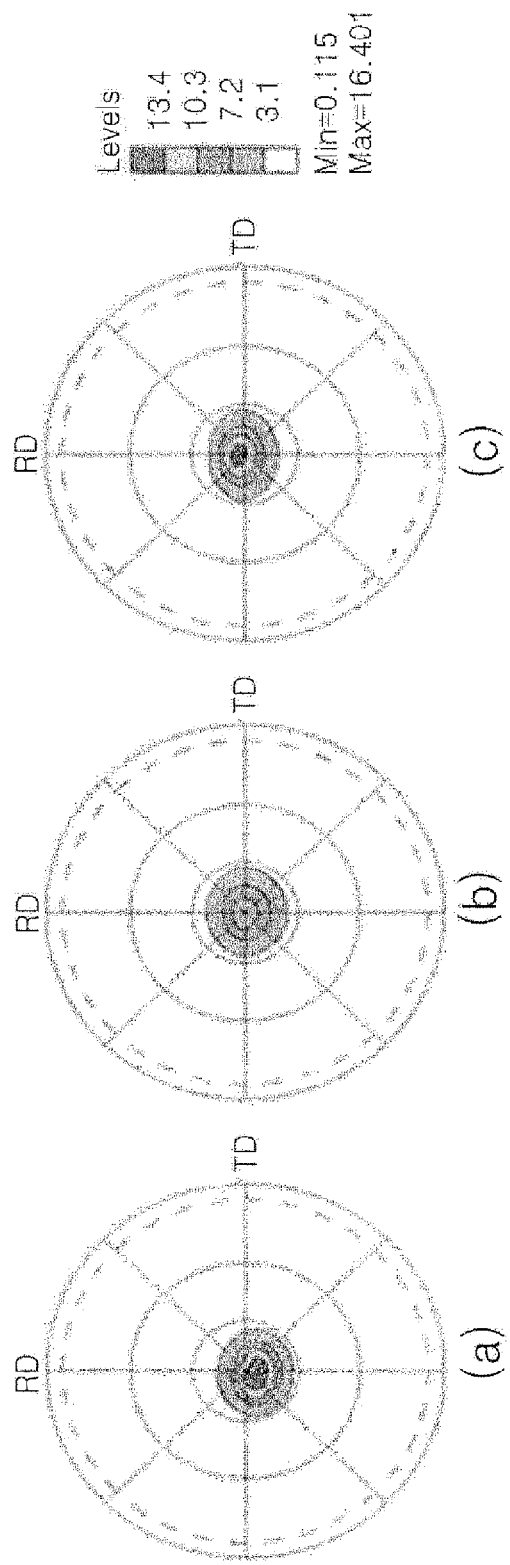
Figure 7:
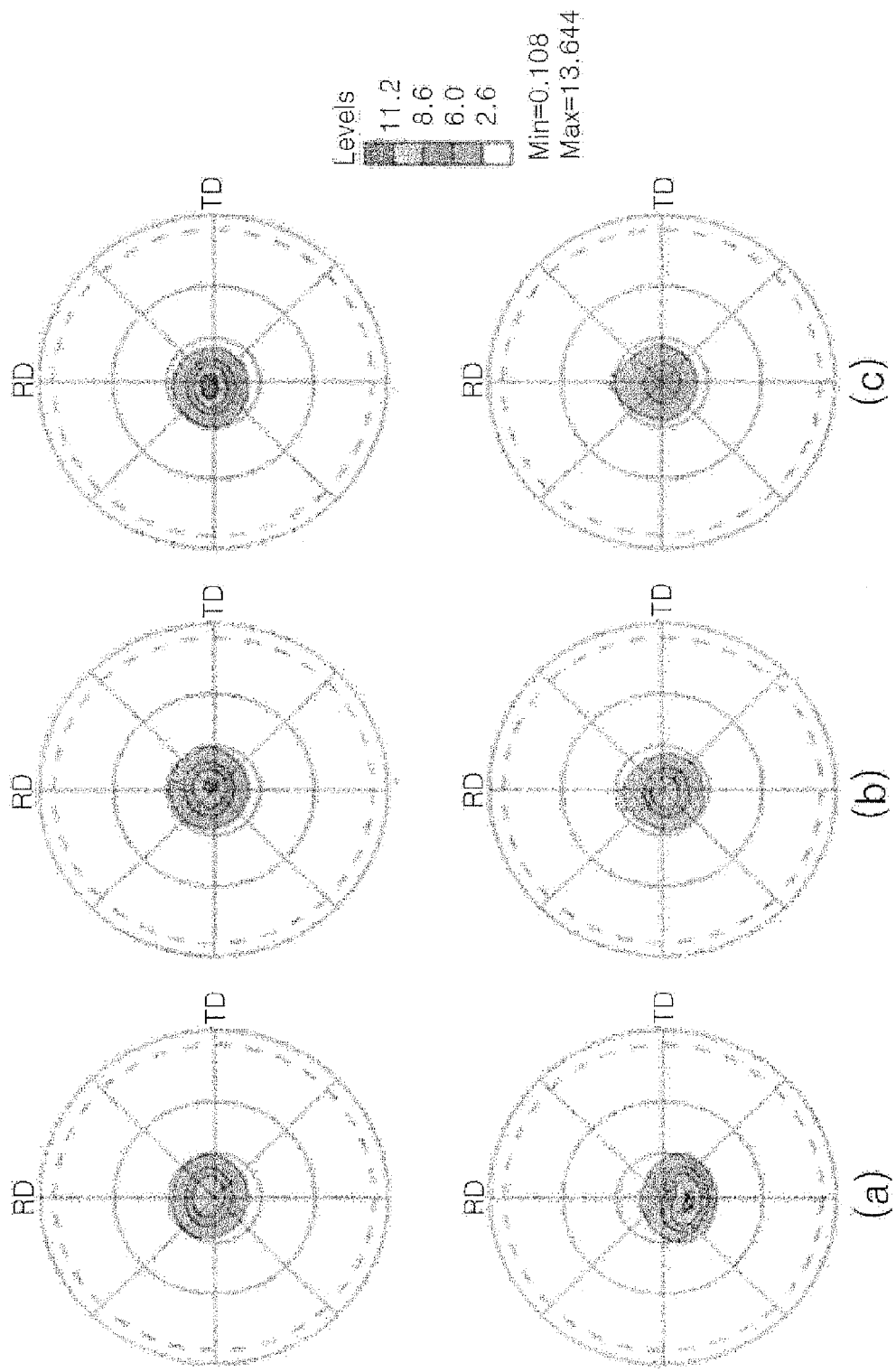

As a comparison, FIGS. 5 to 7 illustrate pole figures of magnesium alloy AZ31 after performing a rolling process using a conventional rolling apparatus that includes working rolls having the same diameters.

The pole figure of FIG. 5 was obtained by applying shear stress to first and second surfaces of AZ31 alloy as a to-be-rolled material by using first and second rolls while the first and second surfaces contacted first and second rolls. In this case, a reduction ratio of AZ3 alloyl was 75% and a rolling temperature was 300. In detail, FIG. 5A illustrates a pole figure after rolling was performed 12 times at a reduction rate per once of 10%, and FIGS. 5B and 5C respectively illustrate a pole figure after rolling was performed 6 times at a reduction rate per once of 20% and a pole figure after rolling was performed 4 times at a reduction rate per once of 30%. Referring to FIGS. 5A to 5C, all of the pole figures have a maximum pole strength of 10 or more under all the conditions above and are focused on a center.

As another comparison, pole figures of FIGS. 6A to 6C were obtained by performing rolling on AZ31 alloy while a rolling temperature was maintained at 200° C. In this case, reduction ratios thereof were 50%, 30%, and 15%, respectively. As illustrated in FIGS. 6A to 6C, all of the basal plane pole figures have a maximum pole strength of 12 or more under all the conditions above and are focused on a center.

From these results, it can be confirmed that when rolling is performed by using a conventional rolling apparatus including first and second rolls having the same sizes, even when a reduction rate or a rolling temperature is changed, a texture is focused on a pole point of a basal plane. However, the texture of AZ31 alloy which is rolled by using a rolling apparatus according to an embodiment of the present invention, compared to the AZ31 alloy which is rolled by using rolls having the same diameters, is configured in a direction that enables substantial improvement in formability.

Also, FIGS. 7A to 7C illustrate (0001) pole figures of an AZ31 alloy that was rolled by using a conventional different speed rolling method in which among working rolls having the same diameters, one roll has a higher rotary linear velocity than the other one. In this case, a ratio of rotary linear velocities of the rolls having different rotary linear velocities was maintained at 3:1, and a rolling temperature was 200, and reduction rates were 70%, 30%, and 15%, respectively. Lower diagrams of FIGS. 7A to 7C illustrate (0001) pole figures of a surface that was subjected to shear deformation by a roll that rotated faster the other one, and upper diagrams of FIGS. 7A to 7C illustrate (0001) pole figures of a surface that was subjected to shear deformation by the other roll that rotated relatively slowly.

Even when the different speed rolling is performed, regardless of a reduction rate and a rotary linear velocity of the rolls, the crystal orientation is focused on a center compared to the corresponding structures of FIG. 3, and the substantial shift of the basal plane pole point away from the center, as illustrated in FIG. 3, did not occur.

From the results above, it can be confirmed that an AZ31 alloy that is rolled by using an asymmetric rolling method according to an embodiment of the present invention, compared to an AZ31 alloy that is rolled by using rolling having the same diameters, is configured such that a crystal direction of the basal plane is a direction that enables embodiment of excellent formability.

Also, when the different speed rolling is performed using working roller having the same diameters, due to the difference in rotary linear velocities of the working rollers, the to-be-rolled material may slip during rolling and thus, in some cases, shear stress may not applied onto the to-be-rolled material by the working rollers, and when slipping out through the working rollers, the to-be-rolled material may bend or a surface thereof may be rough.

However, when an asymmetric rolling method according to an embodiment of the present invention is used, although asymmetric rolling is performed by applying asymmetric shear stress due to the difference in diameters of the rollers while the rolls have the same rotary linear velocities to perform asymmetric rolling, the to-be-rolled material did not slip, unlike in the different speed rolling, a surface roughness did not occur, and the warping of the to-be-rolled material was substantially reduced.

Also, when an asymmetric rolling method according to another embodiment of the present invention is used, rotary angular speeds of the first and second rolls 101 and 102 may be controlled in such a manner that a difference between the rotary linear velocities of the first and second rolls 101 and 102 is equal to or lower than 10%. The rotary linear velocity difference is defined as Equation below:

$$\text{Equation: } \frac{|v_1 - v_2|}{v_2}$$

$v_1$: rotary linear velocity of first roll
$v_2$: rotary linear velocity of second roll This is because if the rotary linear velocity difference of the first and second rolls 101 and 102 having different diameters which is defined in Equality 1 is greater than 10%, the to-be-rolled material that slips out through the first and second rolls 101 and 102 may warp due to stress imbalance or the like.

Also, an asymmetric rolling method including rolling a plurality of times according to an embodiment of the present invention includes rolling the to-be-rolled material 104 two or more times, wherein the two or more times of rolling includes switching surfaces of the to-be-rolled material 104 to which shear stress is applied by the first and second rolls 101 and 102 and rolling the switched to-be-rolled material 104, for at least one cycle.

Figure 8:
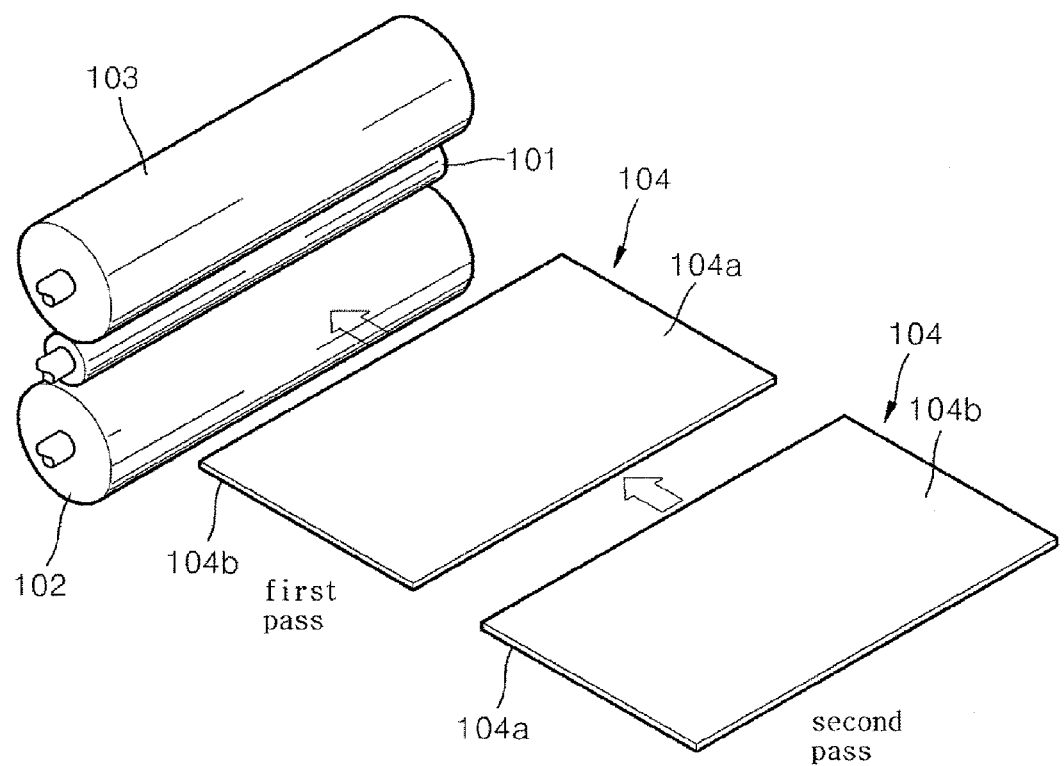
FIG. 8 is a view for explaining a rolling method according to another embodiment of the present invention.

For example, as illustrated in FIG. 8, in a same rolling direction, during a first pass of rolling, the to-be-rolled material 104 is arranged such that the first and second surfaces 104a and 104b of the to-be-rolled material 104 respectively face the first and second rolls 101 and 102, and sequentially, the to-be-rolled material 104 is switched such that the first surface 104a of the to-be-rolled material 104 contacts the second roll 102 and the second surface 104b contacts the first roll 101.

In this regard, two or more passes may be performed by using the same rolls in a batch type. Alternatively, the passes may be independently performed by using a plurality of different rolls.

In this case, because the asymmetric application of shear stress due to the diameter difference between the first and second rolls 101 and 102 is alternately performed on the first surface 104a and the second surface 104b, shear stresses applied to the respective surfaces during the first and second passes may be equalized. The rolling may be performed two or more times according to a target reduction rate, and the number of rolling or the switching period may not be limited as long as the switching and rolling of the first and second surfaces 104a and 104b of the to-be-rolled material 104 are included.

Figure 9:
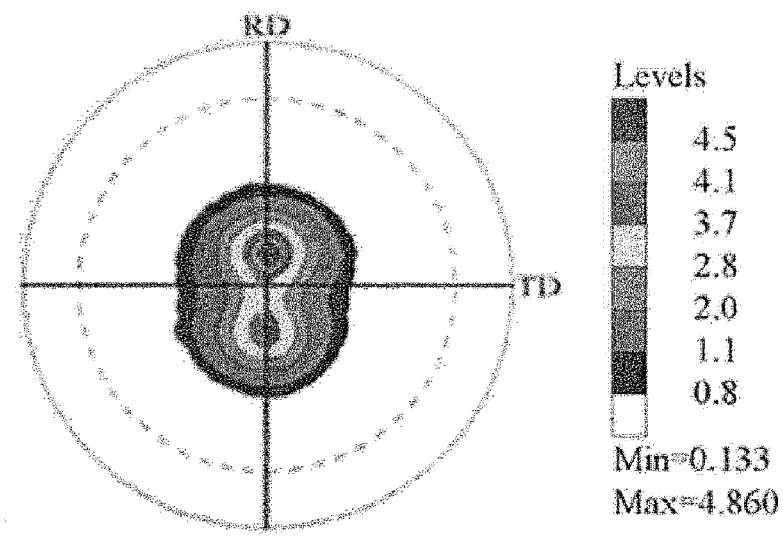
FIG. 9 illustrates a (0001) pole figure of AZ31 alloy which is rolled by using the rolling apparatus described with reference to FIG. 8.

FIG. 9 illustrates a (0001) pole figure of a sample that has a reduction rate of 75% by the total of 5 passes of rolling, wherein an AZ31 alloy was used as a to-be-rolled material, a rolling temperature was 300° C., and rolling surfaces were switched during every pass. In this case, a rotary angle of the basal plane was about 17°, that is very high compared to the pole figures illustrated in FIGS. 5 to 7.

Meanwhile, in the case of the method described with reference to FIGS. 8 and 9 in which rolling is performed a plurality of times in the same rolling direction while contact surfaces between a to-be-rolled material are switched, the to-be-rolled material needs to be physically separated from working rolls. In this aspect, to obtain the same results even when the to-be-rolled material is still arranged between working rolls, a rolling apparatus and a rolling method according to other embodiments of the present invention will be described in detail.

Figure 10:
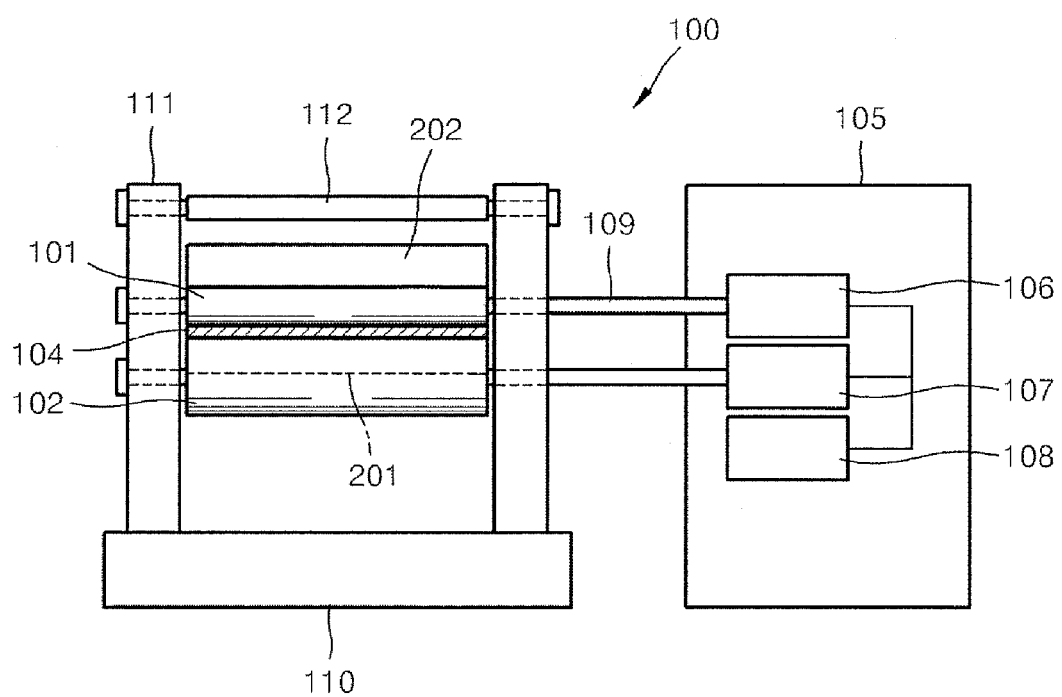
FIG. 10 is a front view of a rolling apparatus according to another embodiment of the present invention.
Figure 11:
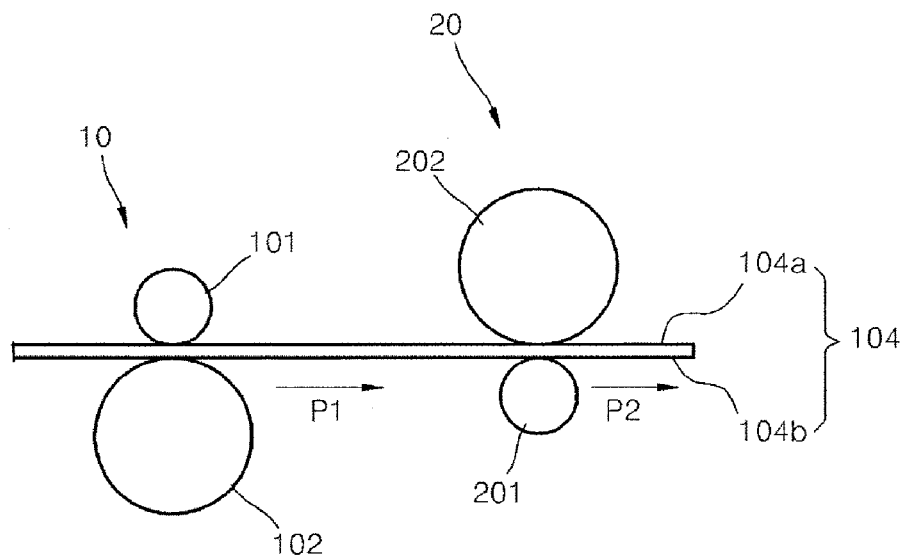
FIG. 11 is a schematic cross-sectional view of the rolling apparatus of FIG. 10.

As illustrated in FIGS. 10 and 11, the rolling apparatus 100 according to another embodiment of the present invention includes the first unit 10 including the first and second rolls 101 and 102 and a second unit 20 including a third roll 201 and a fourth roll 202. The first unit 10 and the second unit 20 may be spaced apart from each other in a direction in which the to-be-rolled material 104 moves. Also, the first and second units 10 and 20 may constitute an asymmetric rolling apparatus, and may be arranged as illustrated in FIG. 11.

In detail, the first unit 10 includes the first roll 101 that contacts the first surface 104a of the to-be-rolled material 104 and the second roll 102 that has a greater diameter than that of the first roll 101 and contacts the second surface 104b of the to-be-rolled material 104, and the second unit 20 includes the third roll 201 that contacts the second surface 104b of the to-be-rolled material 104 and the fourth roll 202 that has a greater diameter than that of the third roll 201 and contacts the first surface 104a of the to-be-rolled material 104.

In this regard, the rolling apparatus 100 may further include a power supply unit that supplies power to each of the first roll 101, the second roll 102, the third roll 201, and the fourth roll 202 in such a manner that rotary angular speeds of the first and second rolls 101 and 102 of the first unit 10 are controlled to be different from each other and rotary angular speeds of the third and fourth rolls 201 and 202 of the second unit 20 are controlled to be different from each other.

In this regard, the digits of the respective units may not necessarily mean a configuration sequence of units in an asymmetric rolling apparatus according to an embodiment of the present invention. For example, FIG. 11, the first unit 10 and the second unit 20 are located sequentially in the progressing direction of the to-be-rolled material 104. However, alternatively, the second unit 20 or other units may be located before the first unit 10.

In the rolling apparatus 100 according to the present embodiment, the to-be-rolled material 104 is rolled by a first pass P1 that is performed by the first unit 10, and subsequently, rolled by a second pass P2 that is performed by the second unit 20. Accordingly, because a shear stress that is asymmetrically applied by the first unit 10 is inversely applied onto the first surface 104a and the second surface 104b by the second unit 20, shear stresses that are applied to the respective surfaces of the to-be-rolled material 104 through the first and second passes P1 and P2 of rolling are equalized to a predetermined level.

The first and second rolls 101 and 102 of the first unit 10 are illustrated as upper and lower rolls, respectively, and the third and fourth rolls 201 and 202 of the second unit 20 are illustrated as upper and lower rolls, respectively. However, this structure is exemplary and other configurations are also available herein. The first and second rolls 101 and 102 of the first unit 10 and the third and fourth rolls 201 and 202 of the second unit 20 may be disposed parallel to each other and spaced apart from each other above the support 110 illustrated in FIG. 10, and may be fixed on the fixed frame 111 by using the coupling member 112, such as a screw or the like.

The power supply unit supplies power to the first unit 10 and the second unit 20 to rotate the first through fourth rolls 101, 102, 201, and 202. The power supply unit may be configured to separately supply power to the first unit 10 and the second unit 20, or may be integrated to supply power to all of the first unit 10 and the second unit 20.

In the present embodiment, the power supply unit is configured to separately supply power to the first unit 10 and the second unit 20. For example, as illustrated in FIG. 10, the power supply unit 105 installed at the first unit 10 may include the first and second motors 106 and 107 that respectively drive the first and second rolls 101 and 102 and the first motor controller 108 that controls rotary angular speeds of first and second motors 106 and 107. Although not illustrated herein, another power supply unit may be installed at the second unit 20, wherein the power supply unit includes a third motor (not shown) and a fourth motor (not shown) which respectively drive the third roll 201 and fourth roll 202 and a second motor controller (not shown) that controls rotary angular speeds of third and fourth motors.

In this regard, the first and second motors 106 and 107 may deliver rotary power to the first and second rolls 101 and 102 through the connection member 109, and the third and fourth motors also deliver rotary power to the third roll 201 and fourth roll 202 through another connection member. The first motor controller 108 controls rotary angular speeds of the first and second rolls 101 and 102 which are connected to first and second motors 106 and 107 by controlling rotary angular speeds of the first and second motors 106 and 107, and through the control, rotary linear velocity v may also be controllable. The second motor controller may also have the same structure as that of the first motor controller 108.

Through the control of rotary linear velocities, the first unit 10 may be controlled such that a shear stress that is applied to the first surface 104a of the to-be-rolled material 104 by the first roll 101 is different from a shear stress that is applied to the second surface 104b of the to-be-rolled material 104 by the second roll 102, and the second unit 20 may also be controlled in a manner similar to that applied to the first unit 10.

According to an embodiment of the present invention, the first motor controller 108 may maintain rotary linear velocities of the first and second rolls 101 and 102 to be identical to each other to roll the to-be-rolled material 104 arranged between the first and second rolls 101 and 102. That is, rotary linear velocities of the first and second rolls 101 and 102 may be maintained to be identical to each other by controlling a ratio of rotary angular speeds of the first and second rolls 101 and 102 to be identical to a ratio of inverse numbers of radii of the first and second rolls 101 and 102.

Also, regarding the second unit 20, rotary linear velocities of the third and fourth rolls 201 and 202 may be able to be maintained to be identical to each other by using the second motor controller. Also, rotary linear velocities of the first through fourth rolls 101, 102, 201, and 202 of the first and second units 10 and 20 may be controlled to be identical to each other.

As described above, when the first and second rolls 101 and 102 of the first unit 10 which have different diameters rotate at the same rotary linear velocities, a shear stress that is asymmetrically applied by the first unit 10 is alternately applied to the first and second surfaces 104a and 104b by the second unit 20. Thus, shear stresses that are applied to the respective surfaces of the to-be-rolled material 104 during the first and second passes P1 and P2 of rolling may be equalized to a certain level.

For this purpose, the first roll 101 of the first unit 10 and the third roll 201 of the second unit 20 may have the same diameters and the second roll 102 of the first unit 10 and the fourth roll 202 of the second unit 20 may have the same diameters. Alternatively, if necessary, the first roll 101 and the third roll 201 have different sizes from each other and the second roll 201 and the fourth roll 202 have different sizes from each other while a ratio of the sizes of the first roll 101 and the third roll 201 is identical to a ratio of the sizes of the second roll 201 and the fourth roll 202.

Figure 12:
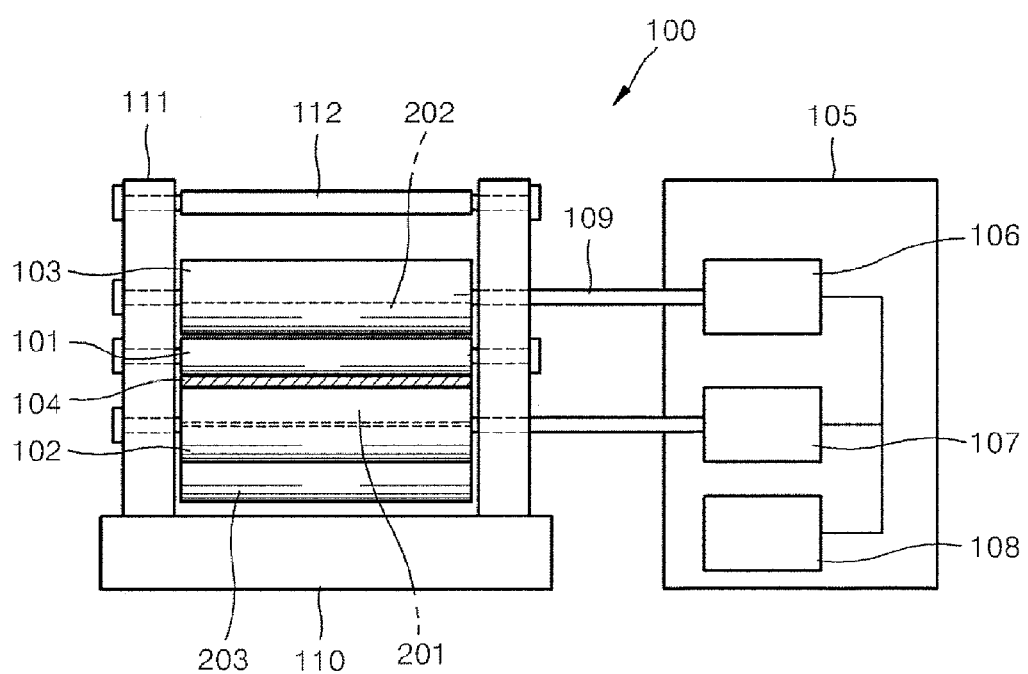
FIG. 12 is a front view of a rolling apparatus according to another embodiment of the present invention.
Figure 13:
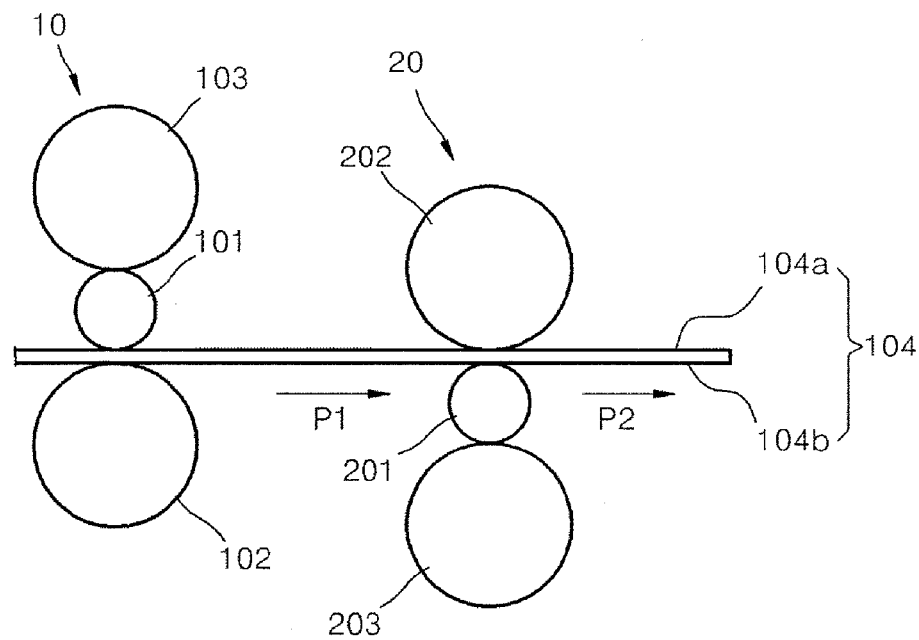
FIG. 13 is a schematic cross-sectional view of the rolling apparatus of FIG. 12.

Also, according to another embodiment, as illustrated in FIGS. 12 and 13, the first unit 10 may further include the backup roll 103 that has a greater diameter than that of the first roll 101, and is coupled to the first roll 101 on an opposite side of the second roll 102 to support the first roll 101, and the second unit 20 may further include a backup roll 203 that has a greater diameter than that of the first roll 201, and is coupled to the first roll 201 on an opposite side of the second roll 202 to support the first roll 201.

In this regard, the first and second rolls 101 and 102 of the first unit 10 may function as working rolls that contact the first and second surfaces 104a and 104b of the to-be-rolled material 104 and apply shear stress thereon, and the first backup roll 103 may allow the first roll 101 to make a balance against an external force from the second roll 102 that has a greater diameter than that of the first roll 101 during rolling. Likewise, the second backup roll 203 of the second unit 20 may allow the third roll 201 to make a balance against an external force from the fourth roll 202 that has a greater diameter than that of the third roll 201.

In this case, the power supply unit may be configured to separately supply power to the first unit 10 and the second unit 20, or may be integrated to supply power to all of the first unit 10 and the second unit 20.

For example, the power supply unit 105 installed at the first unit 10 may include the first motor 106 that drives the first roll 101 or the first backup roll 103, the second motor 107 that drives the second roll 102, and the first motor controller 108 that controls rotary angular speeds of first and second motors 106 and 107. A power supply unit may be installed at the second unit 20, wherein the power supply unit includes the third motor (not shown) that drives the third roll 201 or the second backup roll 203, the fourth motor (not shown) that drives the fourth roll 202, and the second motor controller (not shown) that controls rotary angular speeds of third and fourth motors.

For example, the first motor 106, as illustrated in FIG. 13, is connected to the first backup roll 103 to supply power thereto, and when the first backup roll 103 rotates, the first roll 101 that is coupled to and contacts the first backup roll 103 may rotate due to friction. Although not illustrated herein, alternatively, the first motor 106 may be connected to the first roll 101 to rotate the first roll 101, and due to the friction, the first backup roll 103 rotates. The third motor may also be controlled in this manner.

Figure 14:
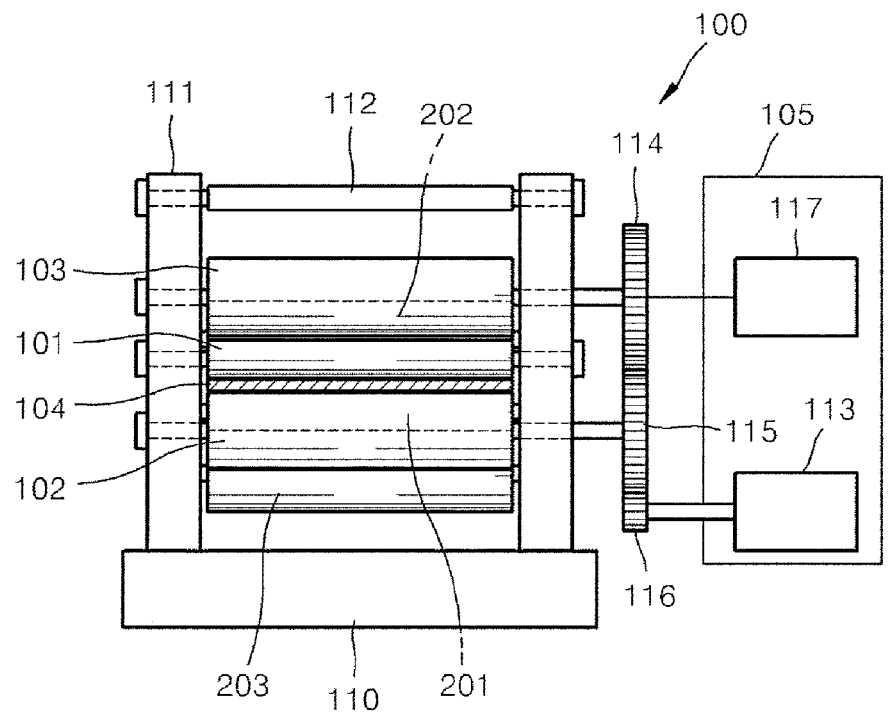
FIG. 14 is a front view of a rolling apparatus according to another embodiment of the present invention.

According to another embodiment of the present invention, power supplied by the power supply unit may be delivered to a working roll through a gear. For example, as illustrated in FIG. 14, in a rolling apparatus in which one unit consists of three rolls, the rolling apparatus may further include a first gear 114 that is connected to the first roll 101 or first backup roll 103 of the first unit 10 and a second gear 115 that is connected to the second roll 102 at a gear ratio that is different from that of the first gear 114, and the power supply unit 105 may include a motor 113 for supplying power to the first gear 114 or the second gear 115. The same description may also be applicable to the second unit 20.

Referring to FIG. 14, the motor 113 supplies power to the second gear 115 through the driving gear 116. However, the rolling apparatus of the present invention is not limited thereto. For example, the motor 113 may supply power directly to the first gear 114 or the second gear 115 through the driving gear 116. Also, unlike the rolling apparatus 100 including the first backup roll 103 and the second backup roll 203 as illustrated in FIGS. 12 and 14, even when only two rolls are used without a backup roll, as described above, the first gear 114 may be connected to the first roll 101 or the fourth roll 202 and the second gear 115 may be connected to the second roll 102 or the third roll 201.

Also, the first gear 114 and the second gear 115 may be variable gears that variably change at least one gear ratio, and a gear controller 117 that is connected to the gear 114 or the second gear 115 may be further included to control a gear ratio. In the rolling apparatus according to the present embodiment, rotary linear velocities of the first and second rolls 101 and 102 are controllable by, for example, controlling gear ratios of the gear 114 and the second gear 115 in consideration of diameters of the first and second rolls 101 and 102 of the first unit 10. For example, power that is generated by the motor 113 may be delivered to the first and second rolls 101 and 102 according to the controlled gear ratios in such a way that the first and second rolls 101 and 102 have the same rotary linear velocities. Also, when the first gear 114 and the second gear 115 are variable gears, gear ratios are variably controlled by the gear controller 117 according to the diameter of the first roll 101 or the second roll 102 to control such that the first and second rolls 101 and 102 have the same rotary linear velocities.

Referring to FIGS. 10 to 13, the first and second units 10 and 20 having different diameters are arranged in a row. However, the configuration of the first and second units 10 and 20 is not limited thereto. For example, a plurality of units may be arranged adjacent to or spaced from each other.

Hereinafter, an asymmetric rolling method according to an embodiment of the present invention will be described in detail by using an asymmetric rolling method using the rolling apparatus 100 illustrated in FIG. 11 or 13.

In detail, referring to FIG. 11 or 13, according to an asymmetric rolling method according to an embodiment of the present invention, the to-be-rolled material 104 having the first surface 104a and the second surface 104b is arranged between the first and second rolls 101 and 102 of the first unit 10, and then, the first and second rolls 101 and 102 are controlled to have different rotary angular speeds and the to-be-rolled material 104 is first-rolled. Then, the to-be-rolled material 104 that has passed through the first unit 10 is guided to enter the second unit 20. Then, the to-be-rolled material 104 is second rolled by using the third and fourth rolls 201 and 202 that are controlled to have different rotary angular speeds.

In this regard, rotary angular speeds of at least one of the pair of the first and second rolls 101 and 102 of the first unit 10 and the pair of the third and fourth rolls 201 and 202 of the second unit 20 may be controlled such that rolls of each of the at least one pair have the same rotary linear velocities.

When a metal material, such as a magnesium alloy, that has poor room-temperature formability is rolled by using the asymmetric rolling method, arranging a slip system on opposite surfaces to obtain ease of shear deformation even at room temperature may lead to excellent room-temperature formability and an improvement in product quality.

Also, an asymmetric rolling method according to another embodiment of the present invention includes rolling a plurality of times by passing the same to-be-rolled material through at least a pair of symmetric unit. According to the rolling a plurality of times, reduction rates which are controlled to an appropriate level are sequentially applied to the to-be-rolled material and thus, problems that may occur when a rapid reduction rate is applied may be preventable.

Also, the plurality of times of rolling includes entering the to-be-rolled material between working rolls when a rotational direction of the working rolls is inversed (that is, the to-be-rolled material moves in a direction opposite to a pass direction) while the to-be-rolled material is still arranged between units, in addition to physically separating a to-be-rolled material from the units of a rolling apparatus and then entering the to-be-rolled material therebetween.

Also, when the asymmetric rolling method according to the above embodiments of the present invention is used, rotary angular speeds of the first and second rolls 101 and 102 of the first unit 10 and the third and fourth rolls 201 and 202 of the second unit 20 may be controlled in such a manner that a difference between the rotary linear velocities of the first and second rolls 101 and 102 or a difference between the rotary linear velocities of the third and fourth rolls 201 and 202 is equal to or lower than 10%, wherein the rotary linear velocity difference is defined in Equation below.

$$\text{Equation:} \frac{|v_1 - v_2|}{v_2}$$

$v_1$: rotary linear velocity of first roll or rotary linear velocity of third roll $v_2$: rotary linear velocity of second roll or rotary linear velocity of fourth roll When the rotary linear velocity difference of the first and second rolls 101 and 102 defined by Equation 1 and the rotary linear velocity difference of the third and fourth rolls 201 and 202 defined by Equation 1 are greater than 10%, the to-be-rolled material that has slipped out through the rolls may warp due to, for example, imbalance stress.

Also, an asymmetric rolling method including rolling a plurality of times according to an embodiment of the present invention may include rolling the to-be-rolled material 104 two or more times, wherein the two or more times of rolling includes switching surfaces of the to-be-rolled material 104 to which shear stress is applied by the first and second rolls 101 and 102 and rolling the switched to-be-rolled material 104, for at least one cycle.

For example, while a rolling direction is maintained constant, the first pass P1 and the second pass P2 are performed on the to-be-rolled material 104 and then, the to-be-rolled material 104 is switched and then a third pass and a fourth pass are performed on the to-be-rolled material 104.

The rolling may be performed two or more times according to a target reduction rate, and the number of rolling or the switching period may not be limited as long as the switching and rolling of first and second surfaces of the to-be-rolled material 104 are included.

Also, a rolling method according to another embodiment of the present invention includes rolling a plurality of times in different rolling directions.

For example, a rolling direction is set in such a manner that a front end of the to-be-rolled material 104 enters first through the first unit 10 and the second unit 20 and then, after the first pass P1 and the second pass P2 are performed, while the surfaces of the to-be-rolled material 104 are maintained the same as during the first pass P1 and the second pass P2, only the direction in which the to-be-rolled material 104 enters through the first and second units 10 and 20 is changed by 180° to allow a rear end of the to-be-rolled material 104 enters first.

The method of rolling a plurality of times in different rolling directions may also include entering the to-be-rolled material between working rolls when a rotational direction of the working rolls is inversed while the to-be-rolled material is still arranged through the working rolls, in addition to physically separating the to-be-rolled material from the working rolls of a rolling apparatus and then entering the to-be-rolled material therebetween.

As described above, when the rolling apparatuses and rolling methods according to the above embodiments of the present invention are used, a rolled material that has improved material properties, such as formability and uniformity, compared to conventional cases may be obtained. In particular, when a metal material, such as a magnesium alloy, that has poor room-temperature formability is rolled by using the rolling apparatuses and rolling methods, a slip system may have a balanced configuration so that shear deformation may easily occur even at room temperature. Thus, excellent room-temperature formability and a product quality improvement may be obtained.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An asymmetric rolling method comprising:
    entering a to-be-rolled material having a first surface and a second surface between a first roll and a second roll that has a greater diameter than that of the first roll and a rotary angular speed that is different from that of the first roll while the first surface and the second surface respectively contact the first roll and the second roll, followed by rolling, and entering the to-be-rolled material between a third roll and a fourth roll that has a greater diameter than that of the third roll and a rotary angular speed that is different from that of the third roll while the first surface and the second surface respectively contact the fourth roll and the third roll, followed by rolling, wherein different shear stresses are applied to the first and second surfaces of the to-be-rolled material, wherein while rotary linear velocities of the first and second rolls are maintained to be identical to each other and rotary linear velocities of the third and fourth rolls are maintained to be identical to each other, the to-be-rolled material is rolled, wherein in the rolling the rolling material, an orientation of the crystal is arranged to improve formability by controlling texture of a rolled material, wherein in the rolling the rolling material, the basal plane slip system of the rolling material is tilted by a angle between more than 0 degree to less than 90 degree with respect to a rolling direction.

2. The asymmetric rolling method of claim 1, wherein while rotary linear velocities of the first, second, third, and fourth rolls are maintained to be identical to each other, the to-be-rolled material is rolled.

3. The asymmetric rolling method of claim 2, wherein while the diameter of the first roll is identical to the diameter of the third roll and the diameter of the second roll is identical to the diameter of the fourth roll, the to-be-rolled material is rolled.

4. The asymmetric rolling method of claim 3, wherein a first backup roll that has a greater diameter than that of the first roll is coupled to the first roll on an opposite side of the second roll to support the first roll, and a second backup roll that has a greater diameter than that of the third roll is coupled to the third roll on the opposite side of the fourth roll to support the third roll.

5. The asymmetric rolling method of claim 1, wherein the to-be-rolled material is rolled at least two times in the same rolling direction of the to-be-rolled material.

6. The asymmetric rolling method of claim 1, wherein the to-be-rolled material is rolled at least two times, wherein the at least two times of rolling comprises changing the rolling direction of the to-be-rolled material and rolling the to-be-rolled material in the changed rolling direction, for at least one cycle.

7. A rolled material fabricated by using the asymmetric rolling method of claim 1.

8. The rolled material of claim 7, wherein the rolled material has a hexagonal closed packed (HCP) structure, a face centered cubic (FCC) structure, or a body centered cubic (BCC) structure.

9. The rolled material of claim 8, wherein the rolled material comprises selected from the group consisting of magnesium (Mg), titanium (Ti), zirconium (Zr), zinc (Zn), aluminum (Al), copper (Cu), iron (Fe), and steel, or an alloy thereof.

10. The asymmetric rolling method of claim 1, wherein after the rolling the rolling material, the rolling material has a minimum rotation angle of a pole point of the basal plane from a center of a pole point is 6°.

11. An asymmetric rolling apparatus comprising:
a first unit comprising a first roll that is to contact a first surface of a to-be-rolled material and a second roll that has a greater diameter than that of the first roll and contacts a second surface of the to-be-rolled material which is opposite to the first surface;
a second unit that is arranged near the first unit and rolls the to-be-rolled material which has been rolled by the first unit, and comprises a third roll that is to contact the second surface of the to-be-rolled material and a fourth roll that has a greater diameter of that of the third roll and is to contact the first surface of the to-be-rolled material; and
a power supply unit for supplying power to each of the first through fourth rolls to control rotary angular speeds of the first through fourth rolls,
wherein the power supply unit controls the first through fourth rolls such that the first and second rolls have the same rotary linear velocities and the third and fourth rolls have the same rotary linear velocities,
wherein in the rolling the rolling material, an orientation of the crystal is arranged to improve formability by controlling texture of a rolled material,
wherein in the rolling the rolling material, the basal plane slip system of the rolling material is tilted by a angle between more than 0 degree to less than 90 degree with respect to a rolling direction.

12. The asymmetric rolling apparatus of claim 11, wherein a diameter of the first roll is identical to a diameter of the third roll and a diameter of the second roll is identical to a diameter of the fourth roll.

13. The asymmetric rolling apparatus of claim 11, wherein the power supply unit comprises a plurality of motors that respectively drive the first roll, the second roll, the third roll, and the fourth roll; and a motor controller for controlling rotary angular speeds of the motors separately.

14. The asymmetric rolling apparatus of claim 13, wherein the motor controller comprises a first motor controller that controls motors such that the rotary linear velocity of the first roll is identical to the rotary linear velocity of the second roll and a second motor controller that controls motors such that the rotary linear velocity of the third roll is identical to the rotary linear velocity of the fourth roll.

15. The asymmetric rolling apparatus of claim 11, further comprising a first backup roll that has a greater diameter than that of the first roll and is coupled to the first roll on an opposite side of the second roll to support the first roll, and a second backup roll that has a greater diameter than that of the third roll and is coupled to the third roll on an opposite side of the fourth roll to support the third roll.

* * * * *